United States Patent [19]

O'Hara

[11] 4,391,552
[45] Jul. 5, 1983

[54] APPARATUS AND METHOD FOR ELIMINATING CHAMPAGNE EFFECT IN COMPRESSED AIR ENERGY STORAGE SYSTEMS

[75] Inventor: John W. O'Hara, Concord, Calif.

[73] Assignee: Bechtel International Corp., San Francisco, Calif.

[21] Appl. No.: 295,893

[22] Filed: Aug. 24, 1981

[51] Int. Cl.³ .............................................. B65G 5/00
[52] U.S. Cl. ...................................... 405/59; 60/398; 405/53
[58] Field of Search ................................ 405/53–59; 62/259, 260; 290/52; 60/39.02, 398; 165/4, 45

[56] References Cited

U.S. PATENT DOCUMENTS

| | | | |
|---|---|---|---|
| 3,385,067 | 5/1968 | Van Eek | 405/59 |
| 3,643,426 | 2/1972 | Janelid | 405/59 X |
| 3,866,058 | 2/1975 | Bernkastel | 290/52 |
| 3,986,339 | 10/1976 | Janelid | 62/45 |
| 4,147,204 | 4/1979 | Pfenninger | 165/4 |
| 4,343,569 | 8/1982 | Schwarzenbach | 405/53 |
| 4,355,923 | 10/1982 | Schwarzenbach | 60/398 X |

FOREIGN PATENT DOCUMENTS 30040  6/1981  European Pat. Off. .............. 405/53

Primary Examiner—Dennis L. Taylor
Attorney, Agent, or Firm—Townsend and Townsend

[57] ABSTRACT

A compressed air energy storage system including a subterranean cavern, a ground level reservoir, a generally vertical shaft and a tunnel connecting the cavern and the lower end of the shaft is disclosed. Air bubbles which form in and rise through the water in the shaft are concentrated at the center of the shaft to thereby form a substantially air free water column in the shaft to insure a constant hydrostatic head in the cavern. The air bubbles are concentrated by imparting a spiral motion to the air bubble/water mixture, primarily with a number of nozzles which inject water into the shaft. Spiral vanes mounted along the interior surface of the shaft, but leaving the shaft substantially unobstructed, aid in imparting rotary motion to the mixture. The bubbles rise along the axis of the shaft and are discharged into the atmosphere. A number of bypass passages parallel the upper region of the shaft and fluidly connect the reservoir with openings in the shaft located a short distance above the nozzles.

11 Claims, 6 Drawing Figures

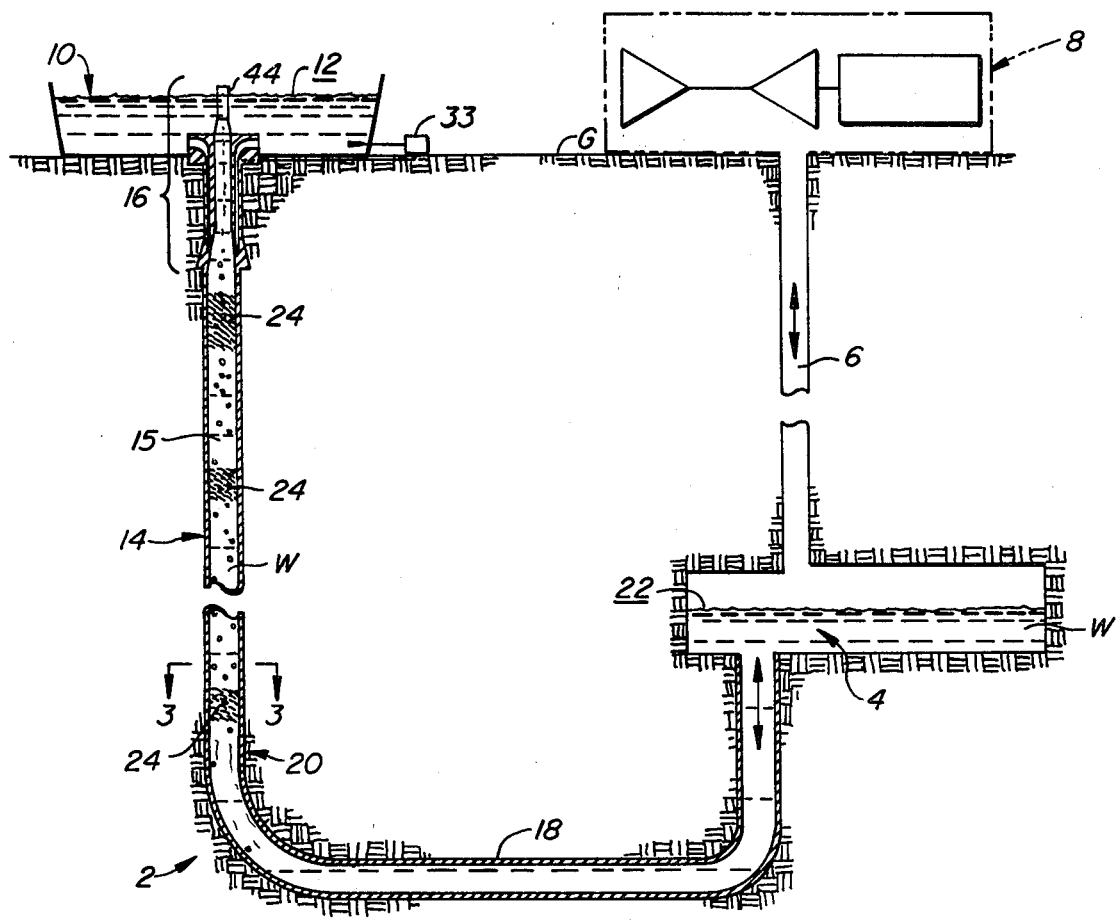
FIG._1.
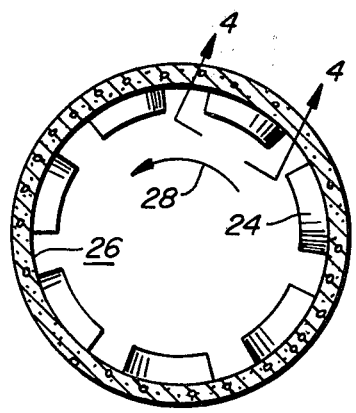
FIG._3.
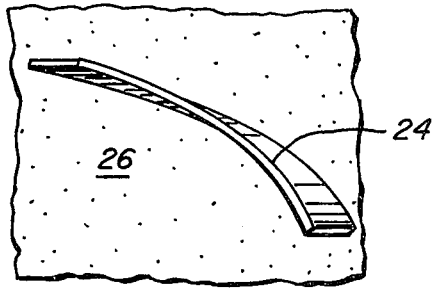
FIG._4.

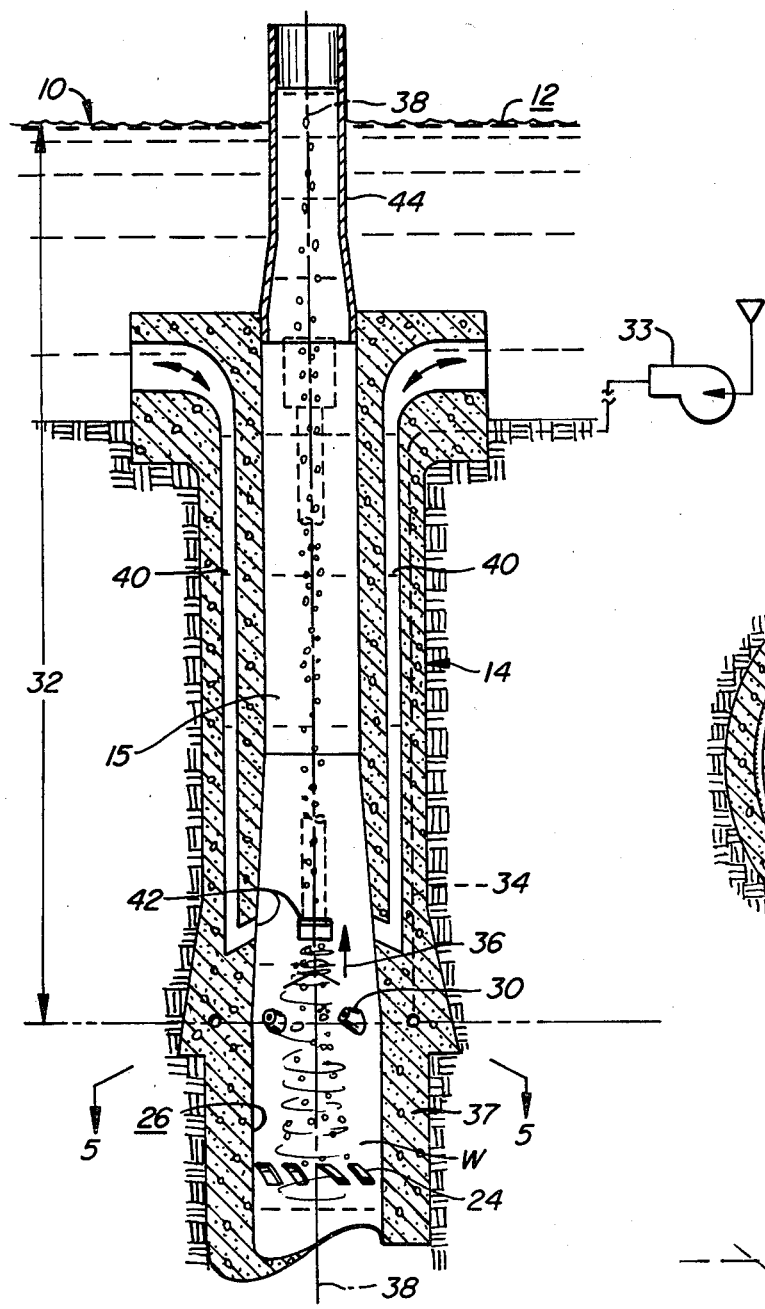
FIG._2.
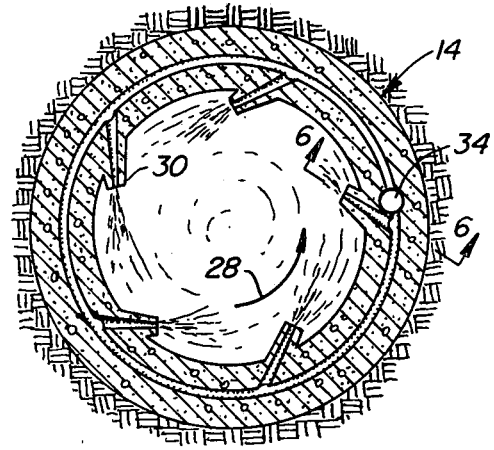
FIG._5.
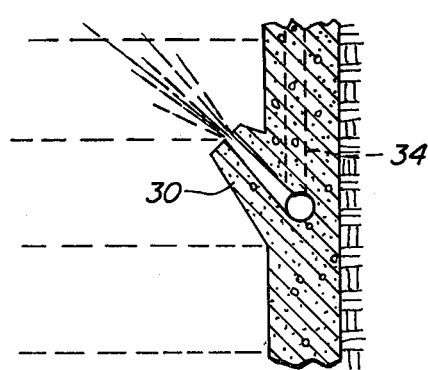
FIG._6.

APPARATUS AND METHOD FOR ELIMINATING CHAMPAGNE EFFECT IN COMPRESSED AIR ENERGY STORAGE SYSTEMS

BACKGROUND OF THE INVENTION

In a compressed air energy storage (CAES) system for producing electricity, the gas turbine type power plants employ large, electrically-driven compressors to compress the air before mixing it with the gas and burning in the combustor to turn the turbine and generate electricity. A large percentage of the power produced by the turbine, e.g. 30 to 35%, is used to compress the air. Since the power demand varies throughout the day, excess power is available from the power plant during off-peak hours. To avoid peak and valley hours and operate the power plant more efficiently, it can be run continually at a relatively constant output but the surplus electrical energy produced during off-peak periods is stored in the form of compressed air. Preferably, the compressed air is stored in a subterranean cavern at a constant pressure. Then, when the demand for electricity is high, compressed air is drawn from the cavern for use with gas in the combustor. The cavern is maintained at a relatively constant pressure by hydraulically coupling it to a compensating reservoir at ground level via a subterranean connecting tunnel and a generally vertical hydraulic compensating shaft.

Air goes into solution with or is absorbed by water at a rate which increases with the air pressure up to a pressure of about 1000 psi. Thus, in a hydraulically compensated compressed air energy storage system, water in the cavern absorbs air at the cavern pressure. The dissolved air in the cavern water diffuses through the water in the connecting tunnel and into the compensating shaft. Pumping air into the cavern and withdrawing it from the cavern causes water to be moved to and from the cavern through the hydraulic compensating system. In the vertical shaft, the dissolved air in the water goes out of solution and forms bubbles, which grow in size and become more numerous as they rise through the shaft toward the surface reservoir.

Uncontrolled, the air bubbles force the water in the upper region of the shaft out of the shaft, a phenomenon often referred to as the "champagne effect." Since the vertical compensating shafts are quite large, for example 2000 feet deep and 12 feet in diameter, the forces and spray produced by the champagne effect are substantial. If uncontrolled, these forces can undesirably stress the upper portion of the compensating shaft and, together with the spray, can adversely affect the reservoir and low land surrounding the shaft.

The champagne effect also causes the effective hydrostatic head of the water column in the shaft to fluctuate, which in turn causes fluctuations in the air pressure within the cavern. Gas turbines, which are used with CAES power plants, need a continuous supply of compressed air at a constant pressure to insure operational stability. Fluctuating air pressures are, therefore, detrimental to the operation of the CAES system power plant and should be minimized.

Several solutions have been suggested for reducing or eliminating the champagne effect within the hydraulic compensating shaft. One method is to prevent absorption of air into the water in the cavern. This may be accomplished by providing an oil film over the water or a solid barrier such as balls or pads floating on the water surface. These solutions have several drawbacks. The liquid film may escape through or be absorbed by the cavern walls and vapors of the liquid are a potential fire or safety hazard. Solid barriers may be attacked by bacteria and microorganisms in the cavern or they may accumulate at one end of the cavern and block the connecting tunnel.

Another method for controlling pressure fluctuations caused by the champagne effect is to maintain a continuous hydrostatic head of air-free water on the water in the cavern. By segregating the bubbles into one path which extends over the depth of the hydraulic compensating shaft, a continuous column of air-free water is formed in the entire compensating shaft so that the air pressure in the cavern remains relatively constant. It has been proposed to effect such a segregation of the air bubbles with arrays of louvers or plates placed across the entire cross section of the shaft at axially spaced points to guide the bubbles along one side of the shaft. Such a system blocks access to the shaft, making maintenance difficult, and may be damaged by water hammer shocks.

In another approach, helical baffles, or vanes, are mounted along the axis of the shaft. They direct the heavier, bubble free water towards the wall of the shaft while the air bubbles flow into a series of coaxial tubular stacks at the center of the shaft and rise therein towards the surface. However, this approach also obstructs access to the shaft and requires an extensive support system for the centrally mounted helical baffles and tubular stacks.

What is needed, therefore, is an environmentally sound, cost effective system for substantially eliminating water spouts at the surface of the compensating shaft and for eliminating pressure fluctuations within the cavern of a hydraulic compensating system caused by the champagne effect in the upper portion of the hydraulic compensating shaft.

SUMMARY OF THE INVENTION

A method and apparatus for providing a continuous hydrostatic head in a compressed air energy storage system is disclosed. The CAES system includes a subterranean cavern, a ground level compensating reservoir, a generally vertically disposed hydrostatic compensating shaft, and a tunnel connecting the cavern and the lower end of the shaft.

To ensure a substantially constant hydrostatic head, a continuous and substantially air bubble-free column of water is developed along the compensating shaft. This is accomplished as follows. A number of spiral spoilers or vanes are mounted along the interior wall of the shaft so that they impart rotary motion to the air/water mixture rising in the shaft. This concentrates the air bubbles towards the central axis of the shaft. A number of high pressure water nozzles positioned above the vanes inject water into the shaft in an upwardly spiraling manner. This causes the air bubbles (hereinafter normally referred to as "air") to coalesce and rise in the center portion of the shaft, thereby producing a cylindrical, tubular column of water adjacent the wall of the shaft which is relatively free of air. In addition, a number of water inlet passages extend parallel to and from the top of the shaft over about 10% of its length. These passages fluidly connect the reservoir with corresponding openings in the shaft wall. The openings are typically situated a relatively short distance above the high pressure nozzles. Consequently, the water in the inlet passages remains substantially free of air because the air is concentrated in the center of the shaft while the peripheral layers of water, which communicate with the passages, are essentially air free.

The air passing upwardly through the compensating shaft passes into the atmosphere without producing the spray of water associated with the champagne effect. The reservoir environment remains essentially unaffected by the discharge of air from the shaft. Pressure fluctuations in the cavern air are effectively eliminated to aid the smooth operation of the CAES power plant.

A primary feature of the present invention is the injection of water through the nozzles causing the air/water mixture to spiral upwardly in the shaft so that an almost continuous hydrostatic head is exerted on the water in the cavern at reasonable cost. The spoilers or vanes aid in the separation of the air from the water and can be formed integrally with the wall of the compensating shaft. The water inlet passages, which agument the action of the nozzles and the vanes, and the high pressure water nozzles can also be formed as integral parts of the wall of the upper portion of the compensating shaft. Thus, the major portion of the interior of the compensating shaft is essentially unobstructed, providing free access to the shaft for maintenance and eliminating readily damaged flow directing structures mounted within the central portion of the shaft.

In use, the spiral vanes induce a preliminary rotary motion to the water in the shaft. The high pressure nozzles greatly increase the rotary motion of the water so that the air collects along the axis of the shaft, thereby creating an air filled inner zone and a substantially air free outer zone of water along the walls of the shaft. The inlet passages provide an essentially air-free water column parallel to the shaft in addition to the water column provided by the compensating shaft; an essentially constant hydrostatic head on the cavern is assured even if air should again intermix with the water column on the wall of the shaft above the high pressure nozzles.

The novel features which are characteristic of the invention, as to organization and method of operation, together with further objects and advantages thereof will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 shows a CAES power plant coupled to a hydraulic compensating system including apparatus of the present invention for maintaining a continuous hydrostatic head.

FIG. 2 is an enlarged view of the upper region of the hydraulic compensating shaft of FIG. 1.

FIG. 3 is a cross sectional view taken along line 3—3 of FIG. 1 showing the spiral vanes.

FIG. 4 is a partial sectional view taken along line 4—4 of FIG. 3 showing an edge view of a spiral vane.

FIG. 5 is a cross sectional view of the hydraulic compensating shaft taken along line 5—5 of FIG. 2.

FIG. 6 is an enlarged sectional view of a nozzle taken along line 6—6 of FIG. 5.

DETAILED DESCRIPTION OF THE PREFERRED EMBODIMENT

Turning now to FIG. 1, a hydraulic compensating system 2 is shown connected to a subterranean cavern 4 which communicates through an air shaft 6 with a compressed air energy storage system power plant 8 at ground level G. System 2 includes a compensating reservoir 10 having a free surface 12 and a hydraulic compensating shaft 14. Shaft 14 defines a main central passageway 15, is fluidly coupled to reservoir 10 at an upper region 16 and is connected to a U-shaped connecting tunnel 18 at its lower end 20. Connecting tunnel 18 fluidly connects shaft 14 with cavern 4. The height of free surface 12 of reservoir 10 above a surface 22 of water W in cavern 4 is typically about 2000". Shaft 14 has a diameter of about 10' although the diameter may well be larger or smaller. The diameter is largely dependent on the maximum rate at which plant 8 is expected to use air from cavern 4 and the size of the cavern.

Referring to FIGS. 2–4, the apparatus of the present invention preferably comprises three major components for controlling the champagne effect to provide a continuous hydrostatic head in cavern 4. First, several sets of vanes or spoilers 24 are formed along the interior surface 26 of shaft 14. The vanes spiral upwardly in a first direction so that air rising through the water in shaft 14 and passing vanes 24 is given a spiral motion in the general direction of arrow 28. The upwardly spiraling air in turn imparts to the water a moderate rotary motion in the direction of arrow 28. Vanes 24 do not extend across the entire cross-section of shaft 14 so that access, such as for maintenance, is not obstructed. The actual depth, spacing, curvature, and size of the vanes or spoilers are determined by hydraulic modeling techniques, including the use of the shaft diameter, depth of the shaft, hydraulic head, cavern pressure, and the like.

Secondly, a plurality of two or more nozzles 30, seen best in FIGS. 5 and 6, are located at a distance 32 (see FIG. 2), for example about 200', below reservoir surface 12. The nozzles 30 are connected to a pump 33 through a conduit 34 and are angled to direct high pressure jets of water inwardly into the shaft so that the water and air rising within shaft 14 spiral upwardly in the direction of arrow 28 of FIG. 5. This centrifuge effect increases the rate of rotation of the air-water mixture and causes the air to accumulate and rise near the center 38 of the shaft. Additional nozzles can be placed along shaft 14 above or below distance 32 to enhance the segregation of air and water.

Thirdly, one or more water inlet passages 40 (see FIG. 2) are formed in the upper region 16 (see FIG. 1) of shaft 14. The passages fluidly connect reservoir 10 with openings 42 in wall surface 26 (see FIG. 2) of shaft 14. Openings 42 are preferably spaced above water nozzles 30 so that the water in the passages remains air free due to the centrifuge effect produced by the water injected into passageway 15 by the nozzles. Since the water adjacent openings 42 is substantially free of air, the water in passageway 40 also remains free of air. Thus, even if portions of shaft 14 above the nozzle again become filled with an air-water mixture, i.e. if air becomes again entrained in the tubular water column along the inside of the shaft wall 37, which would reduce the hydrostatic head in the cavern for the reasons discussed above, a substantially air free water column extending to reservoir 10 is maintained. A stable hydrostatic head is thus maintained in the cavern.

In operation, during periods of low power needs power plant 8 pumps compressd air through shaft 6 into cavern 4. When compressed air is needed by plant 8, it is released from cavern 4 through shaft 6 to the gas turbines in the plant. The pressure in cavern 4 remains relatively constant at about 1000 psi when level 22 is about 2000' below surface 12 of reservoir 10. This is accomplished by insuring that cavern 4, which may be an abandoned mine, has a large horizontal expanse and a relatively small height. Even though large amounts of air may be released from cavern 4, the level of surface 22 will not change significantly.

Air is absorbed by the water in cavern 4 and diffuses into the water in shaft 14. Charging cavern 4 with compressed air and drawing compressed air from the cavern also cause some movement of water between the cavern and compensating shaft 14 via connecting tunnel 18. Air bubbles form, from the air previously diffused in the water, in shaft 14 because the hydraulic pressure decreases as the distance below reservoir 10 decreases. As the air bubbles form, they ascend and pass vanes 24 which impart a spiral motion to them. This in turn moderately rotates the water in the compensating shaft above the vanes. Streams of high pressure water spirally injected through nozzles 30 cause a centrifugal effect and cause the air to collect along axis 38 (see FIG. 2) of shaft 14, thus leaving water adjacent to interior shaft wall surface 26 relatively free of bubbles. A continuous substantially bubble free zone of water is also maintained along upper region 16 (see FIG. 1) of shaft 14 by inlet passages 40.

Thus, a continuous, substantially air free column of water is maintained in the shaft over its entire height. Consequently, the pressure in the cavern remains substantially constant. Further, the segregation of the air from the water facilitates the escape of air from the shaft without carrying significant amounts of water with it to prevent the formation of undesirable water spouts. A tubular extension 44 (see FIG. 1) from the top of shaft 14 to above reservoir level 12 is provided to direct escaping air directly into the atmosphere rather than having it again become entrained with water, which can lead to undesirable water sprays.

Modification and variation can be made to the disclosed embodiment without departing from the subject of the invention as defined in the following claims. For example, vanes 24 can be provided along the shaft above the nozzles as well as below them.

I claim:

1. Apparatus for providing a continuous hydrostatic head in a compressed air energy storage system, said system including a water reservoir at ground level, an underground water storage cavern, and a fluid path connecting the cavern and the reservoir, the apparatus comprising:
   a generally vertical hydraulic compensating shaft defining at least a portion of said fluid path and having a central axis and an upper end fluidly communicating with the reservoir;
   means for fluidly coupling a lower portion of said shaft to said cavern; and
   at least one pressurized water discharge nozzle disposed adjacent an inner surface of said shaft at a discharge level spaced from the reservoir and oriented to discharge a stream of water into the shaft in a direction which imparts a rotary motion to a column of water in the shaft so that air bubbles in the water column collect in the vicinity of the axis of said shaft and a tubular column of water is formed which is relatively free of air bubbles and is disposed along walls of the shaft and above the nozzles.

2. The apparatus of claim 1 further comprising a plurality of vanes mounted to the inner surface of said shaft configured to induce movement of the air bubble and water mixture in said direction of rotation as the air bubbles rise in said shaft to facilitate the concentration of the air bubbles along the axis of said shaft, said vanes being sized so that said shaft remains substantially unobstructed.

3. The apparatus of claims 1 or 2 wherein said fluid path includes a water intake port within said reservoir, said shaft having an opening at an entry level, and a water intake path fluidly connecting said intake port and said opening in said shaft to provide a substantially bubble free column of water to a portion of said fluid path.

4. The apparatus of claim 3 wherein said entry level is located above said discharge level so that said water discharged through said nozzle keeps rising bubbles from entering said opening.

5. The apparatus of claim 1 wherein said discharge level is located at a distance below the surface of the reservoir which is about 10% of the vertical height of the shaft.

6. In a compressed air energy storage system, said storage system including a reservoir of water at ground level, an underground storage cavern and a fluid path connecting the cavern and the reservoir, apparatus for providing a continuous hydrostatic head on the water in the cavern by controlling the flow of bubbles forming in the water along the fluid path, the apparatus comprising:
   a generally vertical hydraulic compensating shaft in said fluid path along which the bubbles form and having a central axis and an upper end fluidly communicating with the reservoir;
   means for fluidly coupling a lower portion of said shaft to said cavern;
   a plurality of vanes mounted to the inner surface of said shaft configured to induce movement of the air bubble and water mixture in a direction of rotation as the air bubbles rise in said shaft for concentrating the air bubbles along the axis of said shaft;
   at least one nozzle disposed adjacent an inner surface of said shaft at a discharge level, said nozzle being adapted to cause water forced therethrough to enter said shaft in said direction of rotation thereby forcing the bubbles to collect along the axis of said shaft; and
   said fluid path including a water intake port within said reservoir, said shaft having an opening at an entry level located above the discharge level, and a water intake path fluidly connecting said intake port and said opening in said shaft to provide a substantially bubble free column of water in the fluid path above the entry level.

7. A method for maintaining a constant hydrostatic head on a body of water in an underground cavern of a compressed air energy storage system, the system including a reservoir of water at ground level, a generally vertical, waterfilled hydraulic compensating shaft having a central axis, an inner circumferential surface and being fluidly connected to the reservoir, and a fluid path connecting a lower end of the shaft with the cavern, the method comprising the steps of:

rotating water in said shaft about the central axis to thereby concentrate air bubbles in the water in the shaft in the vicinity of the axis and form a substantially air bubble free, tubular water column along the inner surface, moving the air bubbles upwardly along the central axis of the shaft, whereby a substantially constant hydrostatic head is maintained on the water in the cavern.

8. A method according to claim 7 wherein the step of rotating comprises the step of injecting a stream of pressurized water into the shaft so that the stream imparts rotation to the water in the shaft.

9. The method of claim 8 wherein the step of rotating further comprises the step of:
imparting a rotary motion to air bubbles rising vertically upward through water in the shaft at a point in the shaft below the point where the stream is injected whereby the rotary motion of the bubbles causes a corresponding rotary motion of the water in the shaft.

10. The method of claim 8 wherein the step of injecting includes the step of orienting the water stream upwardly so that the water and air bubbles in the shaft move spirally upwardly to collect the bubbles along the axis of the shaft.

11. The method of claims 8 or 9 further comprising the steps of forming a column of water substantially free of air bubbles, communicating a lower end of the column with water in the shaft at a point above and proximate to the point where the air stream is injected, and separating the column and the water in the shaft above said point.

* * * * *